United States Patent
Moorehead et al.

(10) Patent No.: US 11,999,011 B1
(45) Date of Patent: Jun. 4, 2024

(54) IN SITU ALLOYING

(71) Applicant: Wisconsin Alumni Research Foundation, Madison, WI (US)

(72) Inventors: Michael Joseph Moorehead, Middleton, WI (US); Adrien Couet, Madison, WI (US); Dan J. Thoma, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 914 days.

(21) Appl. No.: 16/593,431

(22) Filed: Oct. 4, 2019

(51) Int. Cl.
- *B23K 26/342* (2014.01)
- *B23K 26/14* (2014.01)
- *B23K 103/18* (2006.01)
- *B33Y 10/00* (2015.01)
- *B33Y 70/00* (2020.01)
- *C22C 1/04* (2023.01)

(52) U.S. Cl.
CPC ........ *B23K 26/342* (2015.10); *B23K 26/1464* (2013.01); *B23K 26/147* (2013.01); *B33Y 10/00* (2014.12); *B33Y 70/00* (2014.12); *C22C 1/04* (2013.01); *B23K 2103/18* (2018.08)

(58) Field of Classification Search
CPC ... G01N 2203/0005; G01N 2203/0023; G01N 2203/0073; G01N 2291/0258; G01N 29/12; G01N 29/4427; G01N 3/32
USPC ...................................................... 219/76.12
See application file for complete search history.

(56) References Cited

U.S. PATENT DOCUMENTS

| | | | |
|---|---|---|---|
| 6,940,037 B1* | 9/2005 | Kovacevic | B23K 26/144 219/121.45 |
| 2016/0279703 A1* | 9/2016 | Clare | C22C 14/00 |

OTHER PUBLICATIONS

Dobbelstein et al., "Laser metal deposition of a refractory TiZrNbHfTa high-entropy alloy," Additive Manufacturing vol. 24, 2018, pp. 386-390., doi.org/10.1016/j.addma.2018.10.008.

Dobbelstein et al., "Laser metal deposition of compositionally graded TiZrNbTa refractory high-entropy alloys using elemental powder blends," Additive Manufacturing vol. 25, 2019, pp. 252-262., doi:10.1016/j.addma.2018.10.042.

Hofmann et al., "Developing Gradient Metal Alloys through Radial Deposition Additive Manufacturing," Sci. Rep. 4, 5357; DOI:10.1038/srep05357 (2014).

Optomec Inc., "LENS MR-7 Breakthrough additive manufacturing technology for the fabrication & repair of high performance metal components" Available: https://www.optomec.com > Apr. 2014 > LENS_MR-7_Datasheet_WEB_0816 (Jan. 2016).

* cited by examiner

*Primary Examiner* — Dana Ross
*Assistant Examiner* — Joseph W Iskra
(74) *Attorney, Agent, or Firm* — Crawford Maunu PLLC

(57) ABSTRACT

As may be implemented in accordance with one or more approaches herein, a plurality of metal alloy samples are formed on a surface, in which each sample has a different metal alloy composition relative to the others. Elemental metal powders are provided from hoppers at respective delivery rates and mixed, such that the mixture for each sample is set via the respective delivery rates and is different than the mixture for the other samples. Multiple layers of each mixture are deposited by dispensing and melting the mixture to form the respective samples, and one or more layer of each of the samples is remelted

21 Claims, 3 Drawing Sheets

IN SITU ALLOYING

STATEMENT REGARDING FEDERALLY SPONSORED RESEARCH AND DEVELOPMENT

This invention was made with government support under DE-NE0008678 awarded by the US Department of Energy. The government has certain rights in the invention.

OVERVIEW

Aspects of the present disclosure are directed to the design and implementation of such designs for alloyed components.

Various aspects of the present disclosure are directed to addressing challenges to the formation of alloys having differing composition, and to the development of such alloys as may relate to testing and analysis thereof. For instance, development (including testing) and certification of alloys can be very time-consuming and expensive. High-entropy alloys (HEAs) are one class of alloys that have promising properties, which include multiple components, often in near-equimolar ratios. However, the vast space of possible compositional variants under the HEA definition make synthesis, characterization and optimization of compositions challenging.

These and other matters have presented challenges to the development of alloys, for a variety of applications.

SUMMARY

Various example embodiments are directed to apparatuses and methods, which may address various challenges including those noted above.

As may be implemented in accordance with one or more embodiments, a method includes forming a plurality of metal alloy samples on a surface, each sample having a metal alloy composition that is different than a metal alloy composition of the other samples. The samples are formed by, for each sample, supplying elemental metal powders from a plurality of hoppers at respective delivery rates, mixing the supplied elemental powders to create a mixture, the mixture for each sample being set via the respective delivery rates and being different than the mixture for the other samples, and depositing multiple layers of the mixture by dispensing and melting the mixture. A top layer of each of the samples is remelted. In some instances, other deposited layers are remelted one or more times.

In accordance with another embodiment, a method is carried out as follows. Metal-based material is dispensed from a plurality of material sources, each source being operable to dispense the metal-based material at a variable rate. The metal-based material dispensed by the plurality of material sources is mixed and conveyed using a material conduit coupled to the plurality of material sources. A deposition tool is coupled to receive the mixed metal-based material via the material conduit, the deposition tool having control circuitry, a nozzle, and an energy source. The deposition tool is used to deposit layers of a first combination of the materials on a surface by supplying a mixture of the first combination of materials from the plurality of material sources, conveying the mixture to the deposition tool via the material conduit, dispensing the first combination of materials from the nozzle, and melting a first portion of the dispensed materials via the energy source. Each layer as formed includes a second portion of the dispensed materials that remains unmelted, and a top one of the deposited layers is remelted via the energy source to melt the second portion of the dispensed materials in the top layer. Layers of a second combination of materials are deposited, relative to the surface, in which the second combination is different than the first combination, as follows. The rate at which at least one of the material sources dispenses metal-based material is adjusted, a mixture of the second combination of materials is supplied from the plurality of material sources via the adjusted rate, and the mixture of the second combination of materials is conveyed to the deposition tool via the metal conduit. The second combination of materials is dispensed from the nozzle, the dispensed materials are melted via the energy source, and a top one of the deposited layers is remelted.

Another embodiment is directed to an apparatus comprising a plurality of material sources, a material conduit and a deposition too. The material sources are configured to dispense metal-based material at a variable rate, and the material conduit is coupled to the plurality of material sources and configured to receive, mix and convey (after mixing) the metal-based material dispensed by the plurality of material sources. The deposition tool is coupled to receive the mixed metal-based material via the material conduit, and includes control circuitry, a nozzle, and an energy source. The deposition tool is programmed and configured with the plurality of material sources to deposit layers of a first combination of the materials on a substrate surface by: supplying a mixture of the first combination of materials from the plurality of material sources, conveying the mixture to the deposition tool via the material conduit, dispensing the first combination of materials from the nozzle, and melting a first portion of the dispensed materials via the energy source. In various contexts, each resulting layer has a second portion of the dispensed materials that remains unmelted upon deposition, and the deposition tool is programmed to remelt one or more of the deposited layers.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which.

Figure 1:
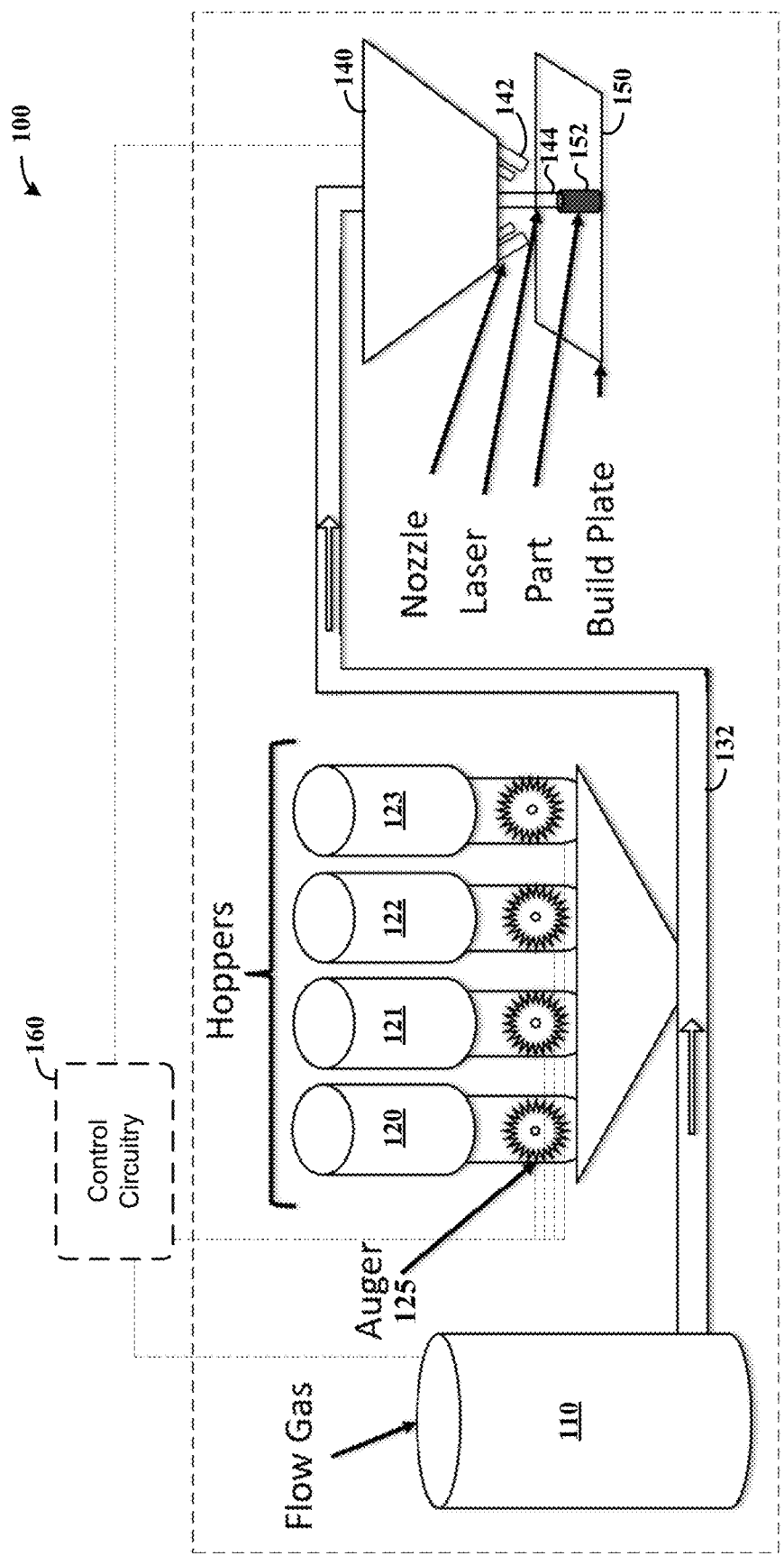
FIG. 1 shows an apparatus for depositing an ally using dynamically adjusted alloy components, as may be implemented in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of apparatuses, systems and methods involving in-situ alloying utilizing multiple material sources that supply material at variable rates. Various aspects of the present disclosure have been shown to be beneficial when used in the context of forming material of different compositions, by dynamically modifying rates at which the respective materials are provided during a deposition process.

As may be implemented in connection with one or more embodiments, a method and/or related apparatus involve forming multiple test samples on a surface, each test sample having a composition that is different than the other test samples, by supplying elemental metal powders from a plurality of hoppers at respective rates that are dynamically modified for setting the composition of each sample. For each sample, the elemental metal powders are mixed, the resulting mixture is dispensed, and the dispensed mixture is melted to form successive layers beginning at a bottom layer on the surface, and extending through a top/final layer. Initial layers including the bottom layer and thereafter provide for elemental separation from the underlying surface. The top layer of each sample is subsequently remelted to reduce an amount of unmelted powder in the resulting layer, while the underlying layers may, if desired, be formed without such remelting.

In connection with this embodiment, it has been recognized/discovered that remelting the top layer facilitates the generation of material at the top layer that is amenable to testing and analysis, while avoiding such a remelting step in the underlying layers saves production time. Further, building sufficient underlying layers in this context provides separation between the top layer and the underlying surface, and therein mitigates interdiffusion of substrate material into the top layer in a manner that facilitates testing and analysis. Accordingly, a single remelting process on the top layer with sufficient underlying layers may produce a homogeneous layer of material sufficient for processes such as ion irradiation, environmental (e.g., corrosion), and micromechanical testing.

As referred to herein, dynamically modifying rates at which materials are provided during a deposition process refers to modifying the rate at which materials are provided for mixing and subsequent deposition as a resulting mixture. This may involve dynamically modifying the rate of materials to alter the resulting mixture as it is used to form a structure, or dynamically modifying the rate of materials to alter the resulting mixture used to form respective structures on a common surface, each respective structure having a material composition that is different from other ones of the respective structures.

Various embodiments are directed to rapidly synthesizing arrays of bulk concentrated alloy coupons from separate elemental powders. Pure elemental powders, stored in separate independently controlled hoppers, are delivered to a print head via pressurized gas such as argon, which mixes the powders in-flight. The mixed powders are heated and melted using an energy source such as a continuous-wave laser, via which the material is deposited onto a surface such as metallic build plate. By translating the build plate and the print head, arbitrary geometries of material can be produced. Such an approach may utilize, for example, a LENS MR-7 metal additive printer available from Optomec of St. Paul, Minnesota. In some implementations, thermo-mechanical properties of printed material are matched with build-plate material selection to minimize thermal stresses, for example, by using pure Mo, Nb, Ta, or W build plates when printing with these elements.

In connection with one or more embodiments, it has been recognized/discovered that, when depositing layers of material using elemental powders, the deposited layers may contain a substantial amount of unmelted powder and exhibit porosity, which may make it unsuitable for certain applications. It has also been recognized/discovered that one or more added remelting steps for respectively deposited layers may facilitate melting of most or all such elemental powders and reduce porosity in the resulting layer. It has further been recognized/discovered that parameters such as hatch spacing, scan speed, mass flow rate, and laser power can be controlled to mitigate porosity and ensure that less unmelted material remains in each deposited layer. In this context, arrays of different alloys can be produced quickly with relatively low chemical segregation, and alloy samples may be produced in bulk quantities. Arrays of printed samples having different compositions can then tested and characterized to enable high-throughput screening and alloy development for a variety of applications, such as for coatings and structural materials.

Accordingly, by changing the ratio of elemental powders used, sample arrays of nearly any combination of targeted compositions formed from a group of elemental (metallic) powders can be rapidly formed (e.g., less than 5 minutes for printing). Moreover, by keeping the elemental powders in separate hoppers, compositions can be changed between samples in seconds, utilizing mixtures of different compositions and/or different components (e.g., with one or more hoppers going unused). Samples may thus be produced in bulk quantities and arrays of differing compositions may be rapidly produced with low chemical segregation. Enhanced alloy development is provided, with high-throughput mechanical, irradiation, and corrosion testing and materials characterization while also supporting modeling efforts through experimental validation.

Various embodiments are directed to and/or utilize a methodology of predicting a final composition of the printed material formed by mixing elemental powders in-flight, prior to depositing (via melting) a layer or layers of the mixture of the elemental powders. Generally, it has been recognized/discovered that the composition of a formed part may be different than that of an elemental powder mixture supplied to and exiting a nozzle or nozzles and used to form the part.

Accordingly, various embodiments are directed to utilizing predictive algorithms and/or tables corresponding to information that provides an indication of a final part composition, relative to a supplied mixture composition, deposition conditions. This information is then used to control the amount of material supplied from respective hoppers (or other material sources), such as by setting a speed at which material augers operate for dispensing elemental powder from each of a plurality of hoppers. The dispensed powders are then mixed (e.g., in-flight) and presented to a nozzle via which the mixture is dispensed and melted for forming a part with a resulting composition.

Various embodiments are directed toward mitigating or eliminating unmelted powder or other supplied material, and to enhancing chemical homogeneity, in deposited materials.

Unmelted powder retention may be minimized by adjusting printing parameters such as lowering powder flow rates, increasing laser power, lowering scan speed, and decreasing hatch spacing, and may involve increasing the amount of energy deposited per unit mass of powder as well as increasing the time during which each location remains molten during printing.

In certain experimental-type embodiments, predicted compositions for a first printing iteration are based on the mass flow rate versus powder hopper RPM calibrations performed for each element (component) being mixed. The result of each powder calibration experiment is a relationship of the following form:

$$m_i = \alpha_i * (RPM)_i + \beta_i \qquad \text{Equation 1}$$

Here, $m_i$ is the mass flow rate of element i which is related to the RPM selected for that powder hopper by experimentally determined coefficients $\alpha_i$ and $\beta_i$. From the mass flow measurements, the mass fraction of species i in the incoming powder is the ratio of the mass flow rate of species i over the total mass flow rate:

$$w_i = \frac{\dot{m}_i}{\sum_{i=1}^{n} \dot{m}_i} = \frac{\alpha_i * (RPM)_i + \beta_i}{\sum_{i=1}^{n} \alpha_i * (RPM)_i + \beta_i} \qquad \text{Equation 2}$$

Similarly, from Equation 2, using $M_i$ as the molar mass, the atomic fraction of species i can be written as:

$$x_i = \frac{M_i * \dot{m}_i}{\sum_{i=1}^{n} M_i * \dot{m}_i} = \frac{M_i * [\alpha_i * (RPM)_i + \beta_i]}{\sum_{i=1}^{n} M_i * [\alpha_i * (RPM)_i + \beta_i]} \qquad \text{Equation 3}$$

For a first printing (deposition) iteration, compositions near an equimolar MoNbTaW composition are formed by varying powder hopper RPMs from the settings previously (e.g., empirically) determined to produce the equimolar MoNbTaW composition. Measured sample compositions may be compared retroactively to compositions predicted using Equation 3.

For a second iteration, effects are lumped into a single fitting term, R, dubbed the retention rate. Using this fitting parameter, the predicted atomic fraction of each element in the printed material can be written as:

$$x_i = \frac{R_i * M_i * \dot{m}_i}{\sum_{i=1}^{n} R_i * M_i * \dot{m}_i} = \frac{R_i * M_i [\alpha_i * (RPM)_i + \beta_i]}{\sum_{i=1}^{n} R_i * M_i * [\alpha_i * (RPM)_i + \beta_i]}; \qquad \text{Equation 4}$$

where $0 \leq R_i \leq 1$

The retention rate for each element may be calculated by performing a least-squares fit on Equation 4 using the measured compositions, $\alpha_i$ and $\beta_i$ values from calibration experiments, and input RPMs.

Possible compositions of four components denoted as the $A_{20}B_{30}C_{20}D_{30}$ type (e.g., $Mo_{20}Nb_{30}Ta_{20}W_{30}$, $Mo_{30}Nb_{30}Ta_{20}W_{20}$), the $A_{20}B_{20}C_{20}D_{40}$ type (e.g., $Mo_{20}Nb_{20}Ta_{20}W_{40}$, $Mo_{20}Nb_{40}Ta_{20}W_{20}$), and equimolar composition can be targeted. Using retention rates calculated from Equation 4, the RPMs necessary to achieve these final compositions may be calculated proactively and used for printing.

A third iteration utilizes experimentally determined mass flow rate coefficients ($\alpha_i$ and $\beta_i$) in addition to the retention rate ($R_i$) as fitting parameters, and the constraint of $0 \leq R_i \leq 1$ is removed. To refine these fitting parameters, the least-squares fit of Equation 4 may be repeated using input RPMs and measured compositions from the second iteration. With the fitting parameters redefined, RPMs necessary to produce the same target compositions from the second iteration may be calculated and used for printing.

In accordance with another embodiment, a method includes forming a plurality of metal alloy samples on a surface, each sample having a metal alloy composition that is different than a metal alloy composition of the other samples. The samples are formed by, for each sample, supplying elemental metal powders from a plurality of hoppers at respective delivery rates, mixing the supplied elemental powders to create a mixture, the mixture for each sample being set via the respective delivery rates and being different than the mixture for the other samples, and depositing multiple layers of the mixture by dispensing and melting the mixture. A top layer of each of the samples is remelted. This may be carried out, for instance, to reduce an amount of unmelted powder mixture and porosity in the top layer.

In some implementations, depositing the multiple layers includes depositing a set of layers underlying the top layer, and depositing the top layer on the set of layers. The set of layers have a thickness sufficient to prevent interdiffusion of material from the substrate into the top layer. In certain implementations, a first layer of the set of layers is deposited on the surface, and successive layers of the set of layers and the top layer are deposited thereon, without remelting any of the layers in the set of layers.

In accordance with another more particular embodiment, a method is carried out as follows. Metal-based material (e.g., elemental powder or a mixture of metals in a powder form) is dispensed from a plurality of material sources that are operable to dispense the metal-based material at a variable rate. The metal-based material is mixed and conveyed to a deposition tool, which deposits layers of a first combination of the materials on a surface, such as by dispensing the mixture via a nozzle and melting the dispensed mixture, as the nozzle is moved relative to a deposition surface/structure. For instance, the mixture may be conveyed through a nozzle using a gas, and heated with a laser to melt the mixture and form layers thereof. In this context, the rate at which each material source dispenses its material can be dynamically modified, such that the amount of respective materials supplied can be tuned on the fly, during a deposition process.

The deposition tool can thus be used to deposit an array of samples, each having a different composition. The deposition tool may further be used to deposit samples or other structures having varied alloy compositions within. In certain implementations, the deposition tool is utilized to repair a structure by depositing a metal alloy composition thereon. Further, the rate of material delivered by one or more of the delivery sources may be adjusted while depositing and melting the material delivered to a deposition tool, for forming a sample or part with different compositions in different regions. For instance, regions of a structure subjected to stress may be provided with a greater material strength relative to other regions of the structure, by dynamically adjusting the rate of material delivered by at least one of the plurality of material sources while melting the mixture of materials to form the structure.

In various contexts, each formed layer includes some unmelted materials of the mixture. This may for example, result from deposition characteristics that can leave some materials unmelted, yet provide for rapid layer formation. By remelting a top layer of a sample, testing of the sample can be facilitated with a more homogeneous composition that also exhibits lower porosity, relative to underlying layers. In this context, it has been recognized/discovered that, samples may be rapidly formed by generating several layers of material while avoiding a remelting step for all layers except a top layer, or a few layers near the top, yet still achieve desired testing characteristics. Further, such underlying layers may mitigate interaction between the top layer(s) being tested and an underlying surface.

Accordingly, layers of a second combination of materials can be deposited, relative to the surface, to form an additional sample. Third, fourth and more sets of layers can be further deposited for additional samples, in which the second combination is different from the first combination. The rate at which one or more of the material sources dispenses metal-based material can be adjusted relative to other samples, such that a mixture of the combination of materials is supplied from the material sources via an adjusted rate, conveyed and deposited.

As such, a plurality of discrete structures may be formed on a surface, each structure having a different composition relative to the other structures, by setting a different rate of material delivered by one or more of the plurality of delivery sources, relative to the rate of material delivered by the one or more of the plurality of delivery sources for forming the other structures.

In some implementations, depositing the layers of each combination of materials may include depositing, for each sample/part, a set of layers including a first layer deposited directly on the surface and at least a second layer deposited on the first layer. The top layer is deposited on the set of layers. The set of layers can be used as discussed above, to prevent interdiffusion of material from the substrate into the top layer. Each layer in the set may be deposited with a single melting, such as via laser deposition, and without any remelting step before deposition of a subsequent layer.

Another embodiment is directed to an apparatus as follows. A plurality of material sources are configured to dispense metal-based material at a variable rate. A material conduit is coupled to the plurality of material sources and is configured to receive and mix the metal-based material dispensed by the plurality of material sources, and to convey the mixed metal-based material. A deposition tool is coupled to receive the mixed metal-based material via the material conduit. The deposition tool has control circuitry, a nozzle, and an energy source, and is further programmed and configured with the plurality of material sources to deposit layers of a first combination of the materials on a substrate surface by: supplying a mixture of the first combination of materials from the plurality of material sources, conveying the mixture to the deposition tool via the material conduit, dispensing the first combination of materials from the nozzle, and melting a first portion of the dispensed materials via the energy source. Each resulting layer has a second portion of the dispensed materials that remains unmelted. One or more of the deposited layers is remelted via the energy source, including melting the second portion of the dispensed materials in the deposited layer(s). Layers of a second combination of materials are deposited, relative to the surface, the second combination being different from the first combination, as follows. The rate at which at least one of the material sources dispenses metal-based material is adjusted, for example using a control output generated based on an intended alloy composition, and a mixture of the second combination of materials is supplied from the plurality of material sources via the adjusted rate. The mixture is conveyed to the deposition tool via the metal conduit, dispensed from the nozzle and melted via the energy source. One or more of the deposited layers is remelted.

The deposition tool may be programmed and configured with the plurality of material sources to deposit the layers of materials in a variety of manners. In some implementations, the deposition tool is programmed to deposit a set of layers including a first layer directly on the surface and at least a second layer deposited on the first layer, with the top layer being deposited on the set of layers. The deposition tool sets the set of layers to be sufficiently thick to prevent interdiffusion of material from the substrate into the top layer. The deposition tool may deposit the set of layers using a single melting of the material deposited for each layer in the set of layers, reducing time to manufacture the layers, while effecting remelting on the top layer to facilitate surface characteristics and/or testing. Additional remelting passes may also be used, in certain instances. In some implementations, the deposition tool forms a plurality of discrete structures on the surface, each structure having a different composition relative to the other structures, by setting a different rate of material delivered by one or more of the plurality of delivery sources, relative to the rate of material delivered by the one or more of the plurality of delivery sources for forming the other structures.

The material sources may include a hopper containing powdered metal-based material, each hopper having a different type of powdered metal-based material, each material source having a mechanical component configured to deliver the powdered metal-based material from the hopper at a variable rate. This rate may be responsive to a control input received from control circuitry and adjusted for the first and second combination of materials.

The deposition tool may be programmed to form a plurality of different types of structures, such as an array of test samples, or a structure having a different composition of materials at different regions within the structure, by adjusting the rate of material delivered by at least one of the plurality of delivery sources while depositing and melting the material delivered to the deposition tool. For instance, consistent with the above the deposition tool may be programmed to form a structure in which regions of the structure subjected to stress are provided with a greater material strength relative to other regions of the structure, by dynamically adjusting the rate of material delivered by at least one of the plurality of material sources while melting the mixture of materials to form the structure. Accordingly, cost and/or weight savings may be effected for regions of a part that are not subjected to as much stress, relative to other regions of the part subjected to stress.

Turning now to the figures, FIG. 1 shows an apparatus 100 for depositing an ally using dynamically adjusted alloy components, as may be implemented in accordance with various embodiments. The apparatus includes a gas supply 110, and material source hoppers 120, 121, 122 and 123 which each have an auger (125 labeled by example) that controls the rate at which material in the hopper is provided. The dispensed materials are then collected into a conduit 132, and mixed in-flight by flow gas from the gas supply 110 as the materials are delivered as a mixture to a deposition tool 140. Control circuitry 160 is utilized to control one or more of gas flow from the gas supply 110, auger speed for the hoppers 120-123, or aspects of the deposition tool 140 such as positioning and laser activation.

The deposition tool 140 may include one or more nozzles 142 that dispense the mixture, and a laser source 144 that melts the dispensed mixture to form a part 152 on an underlying surface 150, such as a part build plate. The deposition tool 140 and surface 150 may be moved relative to one another during the deposition process, to form the part 152 with desired shape, and to form additional such parts on the surface. The laser 144 may be used in a remelting process for one or more deposited layers, such as by rastering across the sample surface without being fed powders from the hoppers 120-123. As discussed further below with the inset of sample 210 of FIG. 2, the apparatus 100 may be programmed to generate a sample having multiple layers in this regard.

Accordingly, each hopper 120-123 may have a different type of powdered metal-based material, and the auger for each hopper delivers the powdered metal-based material from the hopper at a variable rate in response to a control input received from the control circuitry 160. This rate can be adjusted for the respective combinations of materials to be dispensed for different parts. For instance, the apparatus 100 may be programmed to form an array of test pieces as characterized herein, such as by depositing each test piece via multiple layers in which underlying layers are not remelted (and include unmelted powder), with a top layer being remelted to reduce the amount of unmelted powder and mitigate porosity. Other approaches include one or more additional remelting passes for underlying layers, or remelting two or more layers with a single pass.

The apparatus 100 may be utilized in a variety of manners, and as such may be utilized in connection with the various methods characterized herein. In one embodiment, arrays of different high-entropy alloy (HEA) compositions are rapidly produced with the apparatus 100, via additive manufacturing in the form of directed energy deposition (DED), which may be implemented as powder-based metal 3D printing. Powders from each hopper 120-123 are drawn into a gas line conduit 132 using argon, by the rotation of the augers located at the base of each hopper. These powders are consolidated in the gas line and consequently mixed by turbulent gas flow during transit to the deposition tool 140. The mixed powder is sprayed out by nozzles, which may be carried out with rotational symmetry about the optic axis of the deposition tool 140. The laser 144 impinges on the surface 150, which heats and melts the powder mixture, forming a melt pool that can be dragged across the surface, for instance by moving a stage it is affixed to, leaving behind solidified material in its wake. By steering the path of the laser across the surface of the build plate through stage movements, material can be deposited in arbitrary geometries.

In a particular implementation, the hoppers 120-123 are filled with a single elemental powder, respectively of Mo, Nb, Ta, and W, and can be used to form a four-component equimolar HEA MoNbTaW, which may form a single-phase crystal structure that is stable over a broad temperature range. This can facilitate deposition by reducing the likelihood of phase transformations that may cause changes in geometry and additional stresses in the resulting part. By maintaining separation of elemental powders prior to printing, access to any linear combination of the four elements used is achievable. The use of separate elemental powders along with limiting remelting steps facilitates high-throughput alloy synthesis.

In a particular example, plasma spheroidized Mo, Nb, Ta, and W powders are used in the size range of ~45 µm-150 µm (−100/+325 mesh). Deposition passes are performed with a laser power of 800 W and a feed rate of 25.4 cm/min, and remelting passes are performed with a laser power of 1000 W and a feed rate of 177.8 cm/min. It has been recognized/discovered that the increased feed rate helps to avoid high back reflection from the laser.

Calibrations may be performed to measure the mass flow rate of each elemental powder from the hoppers 120-123 as a function of auger RPM for their respective hoppers, the results of which can be stored and used in subsequent composition predictions. With subsequent printing iterations, predictability of a final sample composition can be improved using empirical fitting parameters (such as retention rate) in the calculations. Such approaches may be carried out in the context of the iterative approach characterized hereinabove.

Figure 2:
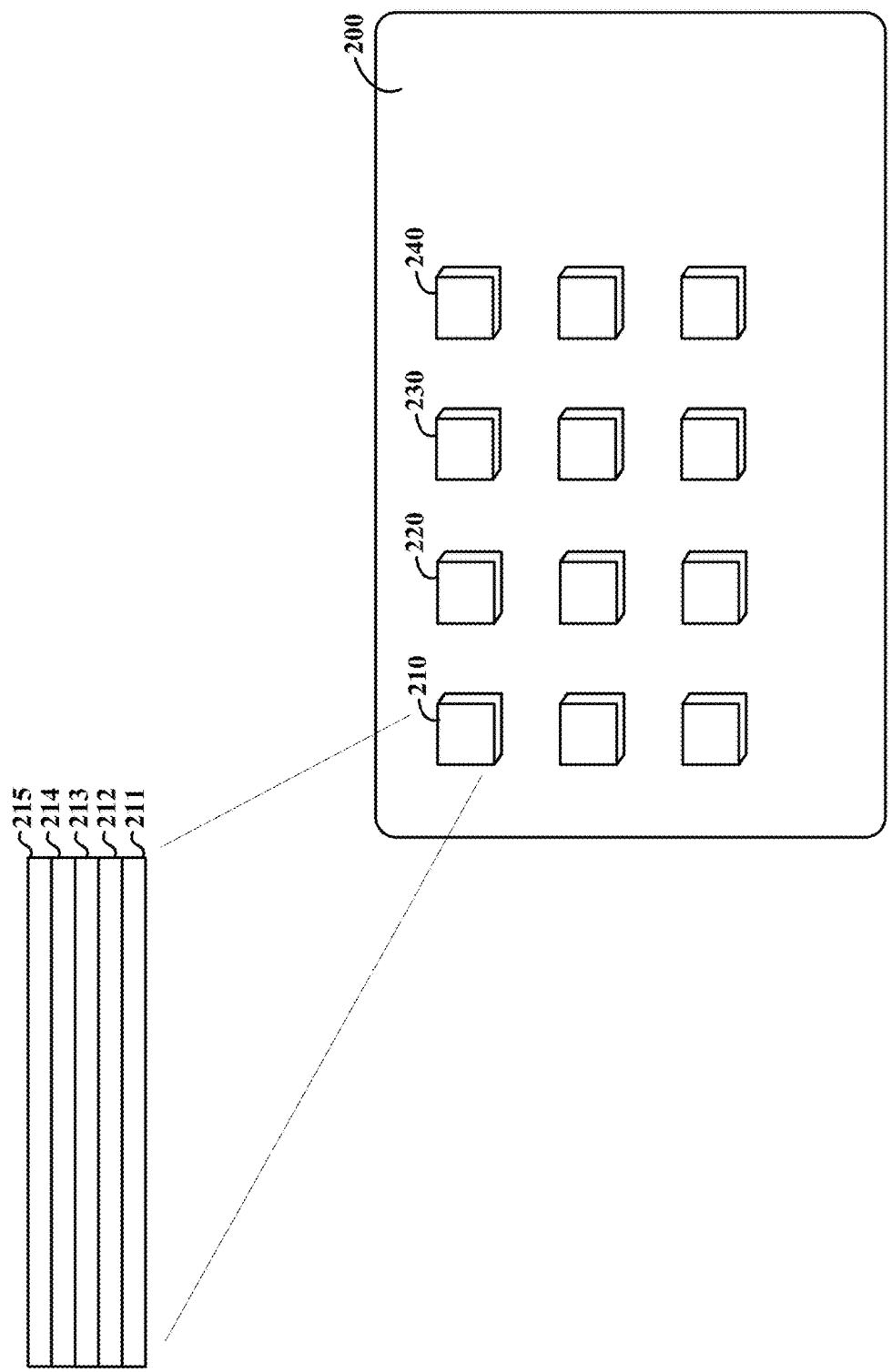
FIG. 2 shows an array of alloyed samples respectively having different alloy components, which may be formed via dynamically adjusting the alloy composition for each component, as may be implemented in accordance with various embodiments.

FIG. 2 shows an array of alloyed samples formed on a surface 200, in accordance with one or more embodiments. Each sample has different alloy components relative to the other samples. The samples are formed by dynamically adjusting the alloy composition for each component. By way of example, samples 210, 220, 230 and 240 are labeled.

Each sample may be formed with multiple layers, with a top layer being remelted. An inset of sample 210 is shown by example, with layers 211, 212, 213, 214 and 215. Layer 211 is formed on the surface 200, with 212-215 subsequently stacked thereon. Layers 211-214 form a set of underlying layers, and layer 215 is a top layer. The set of layers 211-214 may be deposited without any remelting, with layer 215 being remelted to reduce unmelted powder and porosity. In some implementations, the remelting of the top layer 215 is carried out during the same process in which top layers of the other samples are remelted, such that a single remelting step may be carried out for an entire array of samples, saving further time and cost. As characterized herein, such an approach may facilitate rapid and economical sample formation, with underlying layers sufficient to mitigate interaction issues with regard to the surface 200 and the top layer 215.

Figure 3:
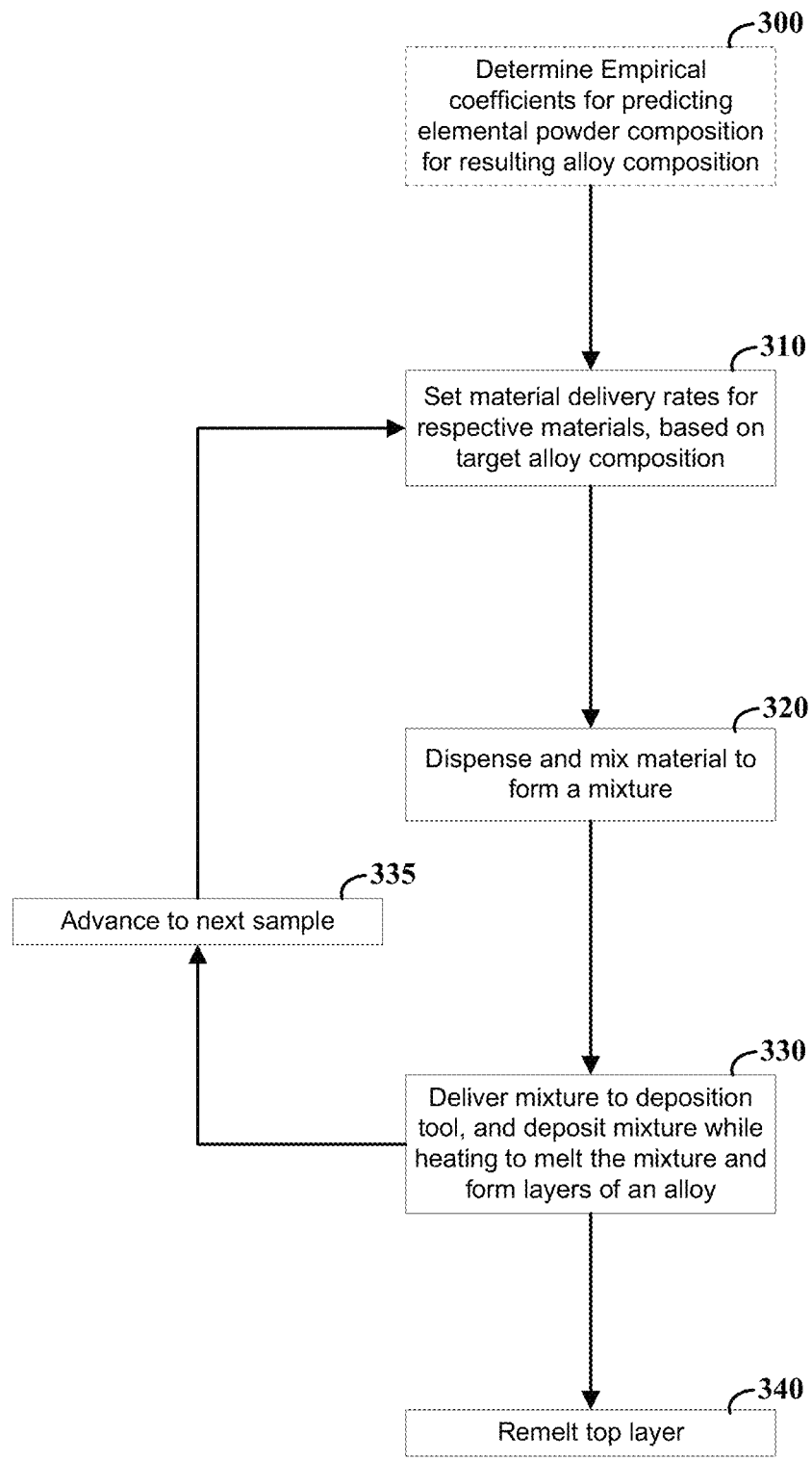
FIG. 3 shows a data flow diagram for a method of depositing material at various alloy composition via dynamic modification of alloy material supplied for the deposition, in accordance with one or more embodiments.

FIG. 3 shows a data flow diagram for a method of depositing material at various alloy composition via dynamic modification of alloy material supplied for the deposition, in accordance with one or more embodiments. At block 300, empirical coefficients for predicting final (melted/alloyed) metal composition, relative to supplied metal powder composition in a mixture, are optionally established for use in dynamically modifying powder composition for generating samples. At block 310, material delivery rates for respective materials are set, based on a target alloy composition. This may utilize, for example, empirical coefficients or other values as established in Block 300.

At block 320, material is dispensed according to the delivery rates set at block 310, and mixed to form a mixture. Such a mixture can be dynamically changed, for example after finishing a first sample and prior to formation of a second sample having a different composition. At block 330, the mixture is delivered to a deposition tool, which deposits the mixture while heating to melt and form layers of an alloy from the mixture. At block 340, a top layer formed at block 330 is remelted.

Multiple samples may be formed in this manner, by advancing to a next sample at block 335 (e.g., moving a deposition tool to a new region of a surface), and repeating the activities in blocks 310, 320 and 330. The remelting activity in block 340 may be performed on each sample as the sample is completed, or on a plurality of samples on a surface after the plurality of samples have been formed. In certain implementations, one or more underlying layers are remelted.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., predicting elemental powder compositions for desired alloys, controlling material delivery, controlling auger RPM, controlling laser remelting). For example, in certain of the above-discussed embodiments, one or more modules are discrete logic circuits or programmable logic circuits configured and arranged for implementing these operations/activities, as in the circuitry 160 implemented with the deposition tool as shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, a combination of a CPU hardware-based circuit and a set of instructions in the form of firmware may be utilized, such as with a first module that includes a first CPU hardware circuit with one set of instructions and a second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, more or fewer alloy components may be provided for deposition, with some approaches using fewer than all alloys in one or more regions of a part or set of parts being formed while dynamically modifying the alloy component supply and, therein, dynamically modifying the resulting structure(s) being formed. Such modifications do not depart from the true spirit and scope of various aspects of the invention, including aspects set forth in the claims.

What is claimed is:

1. A method comprising:
dispensing metal-based material from a plurality of material sources, each source operable to dispense the metal-based material at a variable rate;
mixing the metal-based material dispensed by the plurality of material sources, and conveying the mixed metal-based material using a material conduit coupled to the plurality of material sources; and
using a deposition tool coupled to receive the mixed metal-based material via the material conduit, the deposition tool having control circuitry, a nozzle, and an energy source, to:
deposit layers of a first combination of the materials on a substrate surface by: supplying a mixture of the first combination of materials from the plurality of material sources, conveying the mixture to the deposition tool via the material conduit, dispensing the first combination of materials from the nozzle, and melting a first portion of the dispensed materials via the energy source, each layer having a second portion of the dispensed materials that remains unmelted,
remelt a top one of the deposited layers via the energy source, including melting the second portion of the dispensed materials in the top layer, and
deposit layers of a second combination of materials relative to the surface, the second combination being different than the first combination, by: adjusting the rate at which at least one of the material sources dispenses metal-based material, supplying a mixture of the second combination of materials from the plurality of material sources via the adjusted rate, conveying the mixture of the second combination of materials to the deposition tool via the material conduit, dispensing the second combination of materials from the nozzle, melting the dispensed materials via the energy source, and remelting a top one of the deposited layers.

2. The method of claim 1, wherein:
depositing the layers of the first combination of materials includes depositing a set of layers including a first layer deposited directly on the surface and at least a second layer deposited on the first layer;
the top layer is deposited on the set of layers; and
using the set of layers to prevent interdiffusion of material from the substrate into the top layer.

3. The method of claim 2, wherein depositing the set of layers includes using a single melting of the material deposited for each layer in the set of layers.

4. The method of claim 1, wherein depositing the layers of the first combination of materials and depositing the layers of the second combination of materials includes forming a plurality of discrete structures on the surface, each structure having a different composition relative to the other structures, by setting, for each of the plurality of discrete structures, a different rate of material delivered by one or more of the plurality of delivery sources, relative to the rate of material delivered by the one or more of the plurality of delivery sources for forming the other structures.

5. The method of claim 1, wherein depositing the layers of the first combination of materials and depositing the layers of the second combination of materials includes forming a structure having a different composition of materials at different regions within the structure, and includes adjusting the rate of material delivered by at least one of the plurality of delivery sources while depositing and melting the material delivered to the deposition tool.

6. The method of claim 1, wherein dispensing the metal-based material includes dispensing, from each material source, powdered metal-based material from a hopper in which each hopper has a different type of powdered metal-based material, using a mechanical component to deliver the powdered metal-based material from the hopper at a variable rate in response to a control input received from the control circuitry and adjusted for the first and second combination of materials.

7. The method of claim 1, further including forming a structure in which regions of the structure subjected to stress are provided with a greater material strength relative to other regions of the structure, by dynamically adjusting the rate of material delivered by at least one of the plurality of material sources while melting the mixture of materials to form the structure.

8. The method of claim 1, wherein depositing the layers of the first combination of materials and depositing the layers of the second combination of materials includes moving the nozzle relative to the layers while dispensing and melting the first and second combinations of materials with a laser.

9. A method comprising:
forming a plurality of metal alloy samples on a surface, each sample having a metal alloy composition that is different than a metal alloy composition of the other samples, by, for each sample:
supplying elemental metal powders from a plurality of hoppers at respective delivery rates,
mixing the supplied elemental powders to create a mixture, the mixture for each sample being set via the respective delivery rates and being different than the mixture for the other samples, and
depositing multiple layers of the mixture by dispensing and melting the mixture; and
for each sample, remelting a top one of the multiple layers.

10. The method of claim 9, wherein depositing the multiple layers of the mixture includes depositing a set of layers underlying the top layer and depositing the top layer on the set of layers, the set of layers having a thickness sufficient to prevent interdiffusion of material from the substrate into the top layer.

11. The method of claim 10, wherein depositing the set of layers and the top layer includes depositing a first layer of the set of layers on the surface, and depositing successive layers of the set of layers and the top layer without remelting any of the layers in the set of layers.

12. The method of claim 9, wherein remelting a top layer of each of the samples includes reducing an amount of unmelted powder mixture and reducing porosity in the top layer.

13. The method of claim 9, wherein supplying the elemental metal powders from the plurality of hoppers at respective delivery rates includes:
determining mass flow rate coefficients based on measurements of the mass of powder dispensed over a fixed time measured for a series of rotational speeds of an auger that dispenses the powder;
deriving a retention rate by depositing layers of different metal alloy compositions using respective combinations of the elemental powders, and performing least-squares error minimization of a difference between a measured chemical composition the deposited layers and a predicted composition of the deposited layers as a sum of the respective mass flow rates, qualified for the different metal alloy compositions;
predicting an atomic fraction of each element in deposited layers based on the retention rate and mass flow rate coefficients; and
controlling augers to dispense the elemental powders from the plurality of hoppers based on the predicted atomic fraction.

14. An apparatus comprising:
a plurality of material sources configured to dispense metal-based material at a variable rate;
a material conduit coupled to the plurality of material sources and configured to receive and mix the metal-based material dispensed by the plurality of material sources, and to convey the mixed metal-based material; and
a deposition tool coupled to receive the mixed metal-based material via the material conduit, the deposition tool having control circuitry, a nozzle, and an energy source, and programmed and configured with the plurality of material sources to:
deposit layers of a first combination of the materials on a substrate surface by: supplying a mixture of the first combination of materials from the plurality of material sources, conveying the mixture to the deposition tool via the material conduit, dispensing the first combination of materials from the nozzle, and melting a first portion of the dispensed materials via the energy source, each layer having a second portion of the dispensed materials that remains unmelted,
remelt a top one of the deposited layers via the energy source, including melting the second portion of the dispensed materials in the top layer, and
deposit layers of a second combination of materials relative to the surface, the second combination being different than the first combination, by: adjusting the rate at which at least one of the material sources dispenses metal-based material, supplying a mixture of the second combination of materials from the plurality of material sources via the adjusted rate, conveying the mixture of the second combination of materials to the deposition tool via the metal conduit, dispensing the second combination of materials from the nozzle, melting the dispensed materials via the energy source, and remelting a top one of the deposited layers.

15. The apparatus of claim 14, wherein the deposition tool is programmed and configured with the plurality of material sources to deposit the layers of the first combination of materials by depositing a set of layers including a first layer deposited directly on the surface and at least a second layer deposited on the first layer, the top layer being deposited on the set of layers, the set of layers being sufficiently thick to prevent interdiffusion of material from the substrate into the top layer.

16. The apparatus of claim 15, wherein the deposition tool is programmed and configured with the plurality of material sources to deposit the set of layers using a single melting of the material deposited for each layer in the set of layers.

17. The apparatus of claim 14, wherein the deposition tool is configured and arranged with the material sources to form a plurality of discrete structures on the surface, each structure having a different composition relative to the other structures, by setting, for each of the plurality of discrete structures, a different rate of material delivered by one or more of the plurality of delivery sources, relative to the rate of material delivered by the one or more of the plurality of delivery sources for forming the other structures.

18. The apparatus of claim 14, wherein each material source includes a hopper containing powdered metal-based material, each hopper having a different type of powdered metal-based material, each material source having a mechanical component configured to deliver the powdered metal-based material from the hopper at a variable rate in response to a control input received from the control circuitry and adjusted for the first and second combination of materials.

19. The apparatus of claim 14, wherein the deposition tool is configured and arranged with the plurality of material sources to form a structure having a different composition of materials at different regions within the structure, by adjusting the rate of material delivered by at least one of the plurality of delivery sources while depositing and melting the material delivered to the deposition tool.

20. The apparatus of claim 14, wherein the deposition tool is configured and arranged with the plurality of material sources to form a structure in which regions of the structure subjected to stress are provided with a greater material strength relative to other regions of the structure, by dynamically adjusting the rate of material delivered by at least one of the plurality of material sources while melting the mixture of materials to form the structure.

21. The method of claim 9, wherein for each sample, depositing the multiple layers of the mixture includes depositing a set of layers underlying the top layer by, for each layer in the set of layers, melting a first portion of the layer while leaving a second portion of the layer unmelted, prior to remelting the top one of the multiple layers.

\* \* \* \* \*